US007306129B2

(12) United States Patent
Swiss et al.

(10) Patent No.: US 7,306,129 B2
(45) Date of Patent: Dec. 11, 2007

(54) ONE WAY VALVE ASSEMBLY

(76) Inventors: Stewart Swiss, c/o Aztec Tool Company, 180 Rodeo Dr., Edgewood, NY (US) 11717; Greg Pardes, 425 E. 58th St., Apt. 36G, New York, NY (US) 10022

( * ) Notice: Subject to any disclaimer, the term of this patent is extended or adjusted under 35 U.S.C. 154(b) by 0 days.

(21) Appl. No.: 11/267,868

(22) Filed: Nov. 3, 2005

(65) Prior Publication Data
US 2007/0095862 A1 May 3, 2007

(51) Int. Cl.
*B65D 5/72* (2006.01)

(52) U.S. Cl. ............... 222/494; 222/105; 222/212; 222/213; 222/326; 222/490; 137/853; 604/213

(58) Field of Classification Search ........ 222/490–491, 222/494–497, 420–422, 206–207, 212–215, 222/105, 107, 630–631, 183, 326, 386, 94–95, 222/325, 327; 137/852–853; 604/298, 213
See application file for complete search history.

(56) References Cited

U.S. PATENT DOCUMENTS

| 1,109,682 A | 9/1914 | Kassander |
| 1,908,357 A | 5/1933 | Hornbruch |
| 2,107,596 A | 2/1938 | Bourdon |
| 2,141,507 A | 12/1938 | Bourdon |
| 2,376,712 A | 5/1945 | Moran |
| 2,629,399 A | 2/1953 | Kulick |
| 2,655,178 A | 10/1953 | Sarosdy |
| 2,715,980 A | 8/1955 | Frick |
| 2,943,643 A | 7/1960 | Pinter et al. |
| 2,988,103 A | 6/1961 | Canvasser |
| 3,092,144 A | 6/1963 | Green |
| 3,103,089 A | 9/1963 | Allen |
| 3,124,275 A | 3/1964 | Lake |
| 3,259,281 A | 7/1966 | Pikoske |
| 3,457,694 A | 7/1969 | Tatibana |
| 3,477,195 A | 11/1969 | Chambers |
| 3,506,163 A | 4/1970 | Rauh et al. |
| 3,520,337 A | 7/1970 | Irland et al. |
| 3,528,342 A | 9/1970 | Culcheth |
| 3,534,771 A | 10/1970 | Eyerdam et al. |
| 3,607,098 A | 9/1971 | Strande |
| 3,631,877 A | 1/1972 | Barosko |
| 3,692,071 A | 9/1972 | Begleiter |
| 3,739,952 A | 6/1973 | Chafitz et al. |
| 3,766,816 A * | 10/1973 | Loveless ............ 83/489 |
| 3,902,664 A | 9/1975 | Deines |
| 3,991,768 A | 11/1976 | Portnoy |
| 4,202,470 A | 5/1980 | Fujii |

(Continued)

FOREIGN PATENT DOCUMENTS

WO  WO/2007/055922  5/2007

(Continued)

*Primary Examiner*—Frederick C. Nicolas
(74) *Attorney, Agent, or Firm*—Abelman, Frayne & Schwab

(57) ABSTRACT

A one way valve assembly flows a sterile flowable substance from a source to an outlet orifice and prevents any backflow of contaminants through the one way valve assembly when the flowable substance ceases to flow. The valve assembly includes an elastomeric membrane which aids in preventing any backflow of contaminants when dispensing of the flowable substance is stopped.

20 Claims, 5 Drawing Sheets

U.S. PATENT DOCUMENTS

| | | | |
|---|---|---|---|
| 4,254,791 A | 3/1981 | Bron | |
| 4,283,991 A | 8/1981 | Gaun et al. | |
| 4,338,765 A | 7/1982 | Ohmori et al. | |
| 4,346,704 A | 8/1982 | Kulle | |
| 4,349,133 A | 9/1982 | Christine | |
| 4,355,639 A | 10/1982 | Di Salvo | |
| 4,392,576 A | 7/1983 | Berger et al. | |
| 4,397,132 A | 8/1983 | Pardes et al. | |
| 4,413,757 A | 11/1983 | Adler | |
| 4,415,121 A | 11/1983 | Berger et al. | |
| 4,421,510 A | 12/1983 | Ahlbeck | |
| 4,424,917 A | 1/1984 | Berger et al. | |
| 4,568,333 A | 2/1986 | Sawyer et al. | |
| 4,646,781 A | 3/1987 | McIntyre et al. | |
| 4,657,530 A | 4/1987 | Buchwald et al. | |
| 4,657,536 A | 4/1987 | Dorman | |
| 4,702,398 A * | 10/1987 | Seager | 222/386 |
| 4,722,731 A | 2/1988 | Vailancourt | |
| 4,819,684 A | 4/1989 | Zaugg et al. | |
| 4,846,810 A * | 7/1989 | Gerber | 604/247 |
| 4,852,851 A | 8/1989 | Webster | |
| 4,898,306 A | 2/1990 | Pardes | |
| 5,076,322 A | 12/1991 | Choksi et al. | |
| 5,080,138 A * | 1/1992 | Haviv | 137/853 |
| 5,080,139 A | 1/1992 | Haviv | |
| D323,984 S | 2/1992 | Hamilton et al. | |
| 5,092,855 A * | 3/1992 | Pardes | 604/247 |
| D326,217 S | 5/1992 | Petschek | |
| D327,430 S | 6/1992 | Farricielli | |
| D327,431 S | 6/1992 | Farricielli | |
| D327,432 S | 6/1992 | Farricielli | |
| D328,244 S | 7/1992 | Hamilton et al. | |
| 5,129,550 A | 7/1992 | Eschbach | |
| D328,429 S | 8/1992 | Ben-Uri | |
| D332,739 S | 1/1993 | Petschek | |
| 5,178,300 A | 1/1993 | Haviv et al. | |
| D334,137 S | 3/1993 | Petschek | |
| 5,190,190 A * | 3/1993 | Fudalla | 222/105 |
| RE34,243 E | 5/1993 | Gerber | |
| 5,279,330 A | 1/1994 | Debush | |
| 5,279,447 A | 1/1994 | Petschek | |
| 5,305,783 A | 4/1994 | Debush | |
| 5,305,786 A * | 4/1994 | Debush | 137/512.3 |
| 5,320,845 A | 6/1994 | Py | |
| 5,353,961 A | 10/1994 | Debush | |
| 5,613,517 A | 3/1997 | Handler | |
| 5,613,957 A | 3/1997 | Py | |
| 5,653,251 A | 8/1997 | Handler | |
| 5,685,869 A | 11/1997 | Py | |
| 5,836,484 A * | 11/1998 | Gerber | 222/494 |
| 5,944,702 A | 8/1999 | Py | |
| 6,302,101 B1 | 10/2001 | Py | |
| 6,325,253 B1* | 12/2001 | Robinson | 222/212 |
| 6,386,395 B1* | 5/2002 | Lunghetti | 222/213 |
| 6,505,622 B2 | 1/2003 | Py | |
| 6,536,631 B1* | 3/2003 | Nickels et al. | 222/212 |
| 6,662,977 B2* | 12/2003 | Gerber et al. | 222/494 |
| 6,695,173 B1* | 2/2004 | Fontana | 222/212 |
| 6,766,816 B2 | 7/2004 | Secondo | |
| 6,892,906 B2 | 5/2005 | Py et al. | |
| 6,896,151 B1* | 5/2005 | Robinson | 222/1 |
| 6,997,219 B2 | 2/2006 | Py et al. | |
| 7,077,176 B2 | 7/2006 | Py | |
| 7,226,231 B2 | 6/2007 | Py et al. | |

FOREIGN PATENT DOCUMENTS

| | | |
|---|---|---|
| WO | WO/2007/056131 | 5/2007 |
| WO | WO/2007/056233 | 5/2007 |

\* cited by examiner

Reservoir At Rest

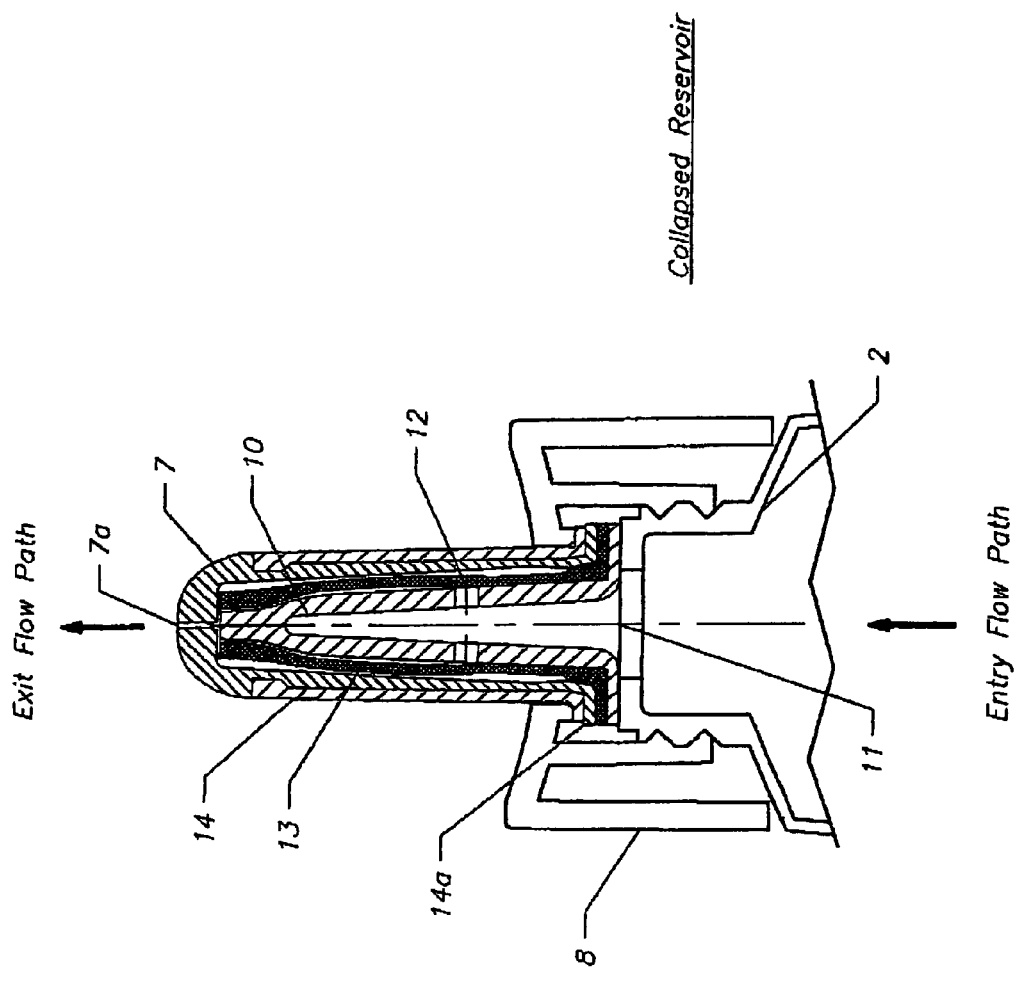

ONE WAY VALVE ASSEMBLY

BACKGROUND OF THE INVENTION

The present invention is directed to a one way valve assembly for dispensing a sterile flowable substance while preventing any backflow of contaminants into the source of the flowable substance. The valve assembly includes a valve body enclosed by a pressure displaceable flexible member or elastomeric member for effecting the passage of the flowable substance to a controllable outlet while preventing any backflow to the source of the flowable substance after dispensing individual portions of the flowable substance.

In the past, to maintain the flowable substance free of contaminants, preservatives have been mixed in the flowable substance in the container from which it is to be dispensed. The use of preservatives is an added expense and tends to limit the effectiveness of the flowable substance, particularly when the flowable substance is a pharmaceutical such as an eye care solution or it is a food stuff.

Another consideration is the ability of the valve assembly to deliver a selected amount to the outlet without causing any damage to the user, such as when applying an eye care solution directly into the eye. In recent years, flexible membranes have been used to control the flow of the flowable substance to the valve assembly outlet while preventing any backflow to the source of the flowable substance, however, it has been difficult to provide an effective procedure for manufacturing the valve assembly and limiting its costs.

SUMMARY OF THE INVENTION

Therefore, the primary object of the present invention is to provide a valve assembly for conveying a flowable substance from a closed source, such as a collapsible container while preventing any backflow of contaminants through the valve assembly into the source of the flowable substance after a portion of the substance has been dispensed.

The collapsible container can be a bellows type, a tube, an internal bag or other type of collapsible form designed to dispense practically all of its contents. The container has a normally closed controllable outlet surface for dispensing a flow of the flowable substance out of the valve assembly. The container is in sealed contact with the valve assembly so that its contents do not receive any contaminants when the flowable substance is dispensed.

Dispensation of the flowable substance is effected by applying pressure to the container so that its contents flow to the valve assembly. The contents may be a pharmaceutical, such as an eye care solution or other substance which must be kept free of contaminants during dispensing a multiple number of dispensed amounts. Other flowable substances can be food stuffs or beverages, cosmetics, or other flowable substances intended to be maintained free of contaminants during the dispensing operation. The container may be protected by a housing so that pressure is not accidentally applied.

The valve assembly is an axially extending structure open to the container of the flowable substance. The valve assembly is formed of an axially extending inner core open to the container and formed of a rigid plastic component. The interior of the core has a passageway for receiving the flowable substance from the container. At least one port extending from the passageway affords an opening for conveying the flowable substance out of the inner core.

Tightly enclosing the inner core is an axially extending flexible membrane covering the outlet end of the port through the inner core. The flexible membrane moves outwardly from the inner core when the flowable substance is pressurized and passes through the port and flows toward the outlet end of flexible membrane.

Laterally outwardly from the flexible membrane is a valve cover ending in the controllable outlet orifice. The pressurized flowable substance travels between the radially outwardly extended flexible membrane and the outer surface of the inner core and flows to the controllable outlet orifice. The outlet orifice can provide for a limited amount of the flowable substance to be dispensed.

An over cap covers the exterior of the valve cover to protect the valve assembly during storage, and to avoid accidental dispensing.

A collar joins the valve assembly to the container and affords a sealed arrangement preventing any flow of contaminants into the container.

The various features of novelty which characterize the invention are pointed out with particularity in the claims annexed to and forming a part of this disclosure. For a better understanding of the invention, its operation, advantages and specific objects attained by its use, reference should be had to the accompanying drawings and descriptive matter in which there are illustrated and described a preferred embodiment of the invention.

BRIEF DESCRIPTION OF THE DRAWINGS

FIG. 3b is a partial view similar to FIG. 3a, however, with the one way valve assembly in the dispensing position.

DETAILED DESCRIPTION OF THE INVENTION

Figure 1:
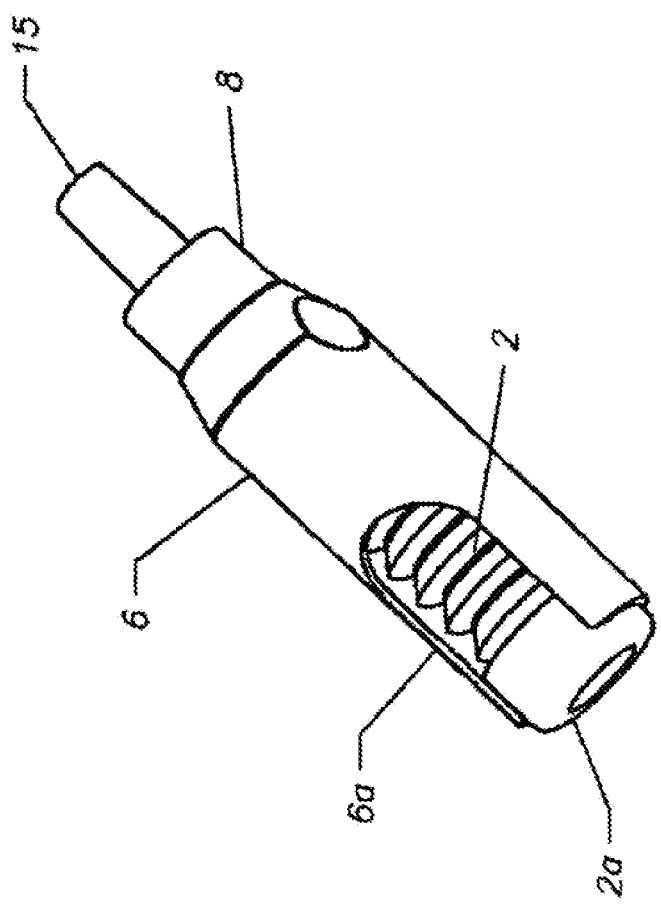
FIG. 1 is an axially extending view of a one way valve assembly embodying the present invention.
Figure 2:
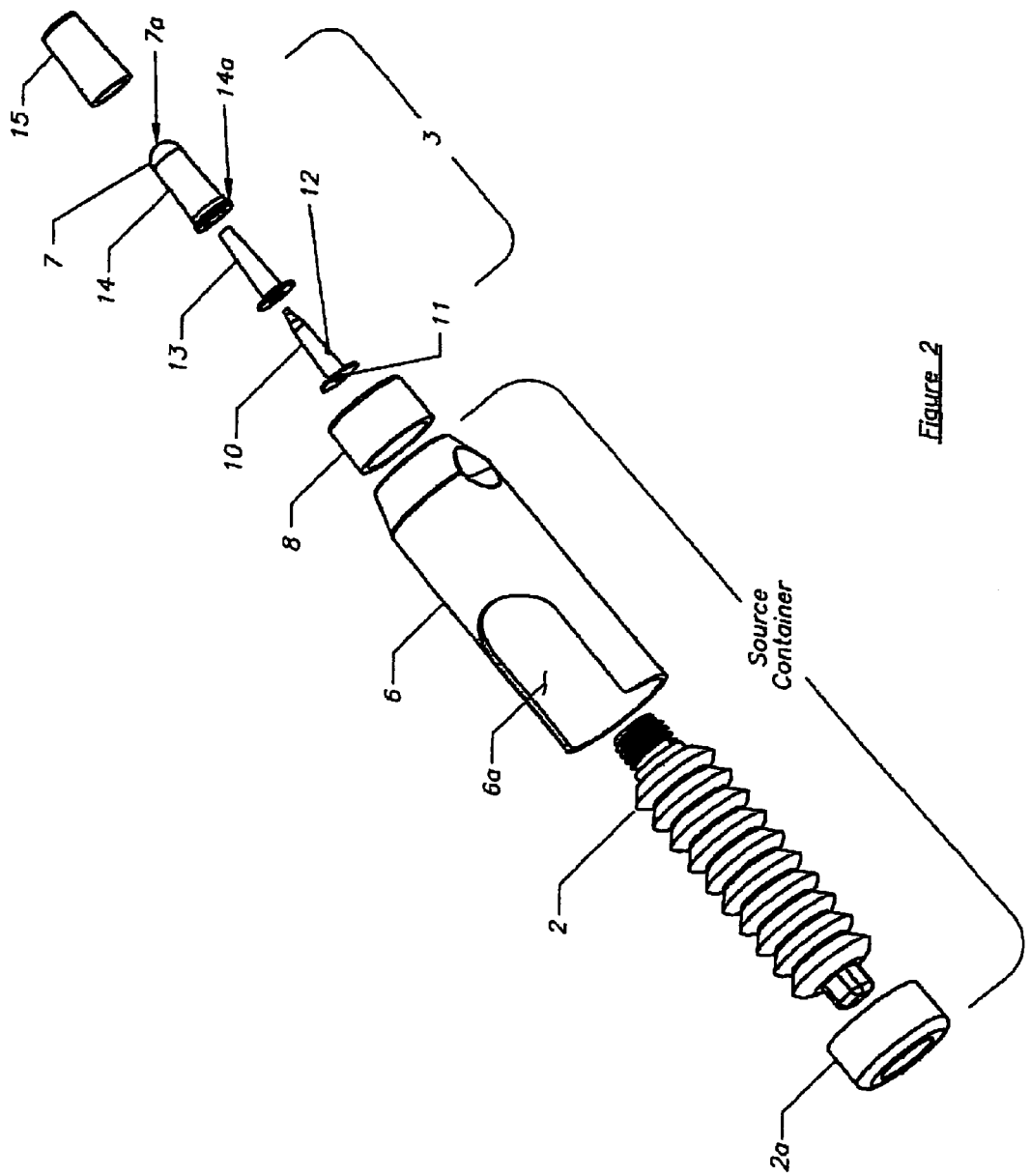
FIG. 2 is an exploded view of the one way valve assembly shown in FIG. 1.

As shown in FIGS. 1 and 2, the one way valve assembly 1 is composed of a bellows container or source 2 holding a sterile flowable substance, a valve assembly 3 for conveying the flowable substance from the container 2 to an outlet when pressure is applied to the container 2 and an over cap 15 covering the valve assembly 3 to prevent contamination from entering the valve assembly 3 during storage.

The bellows container 2 collapses when pressure is applied to the container, however, other containers may be used such as a tube or an internal bag in a container which permit multi-dose dispensation of the flowable substance without contamination entering the container following the dispensing procedure.

The flowable substance may be a pharmaceutical, such as a eye care solution, a food stuff, such as products or juices, and a cosmetic, such as a skin care solution or toiletries, and liquid vitamins, all of which are intended to be maintained free of contaminants from the ambient atmosphere.

The bellows container or source 2 is laterally enclosed by an axially extending housing 6 to provide better ergonomic control during dispensing. A slot 6a extending axially in the housing 6 permits a user to gain access to an actuator 2a of the container as the flowable substance is pressed out.

A collar 8 connects the valve body 3 to the container 2 affording a sealed connection so that ambient contaminants cannot pass into the container 2.

The valve assembly 3 has an axially extending inner core 10 bearing against the opening of the container 2 so that flow from the container enters into an axially extending blind passageway 11 in the inner core. The passageway 11 extends for a major portion of the axial length of the inner core. At approximately half the length of the passageway 11 the inner core has at least one port 12 extending transversely of the passageway axis from the surface of the passageway to the outer surface of the inner core 10. The inner core 10 is formed of a rigid plastic material and terminates inwardly of the outlet end of the valve body.

A flexible membrane 13, such as an elastomeric member, is fitted tightly over the outer surface of the inner core and extends from the opening in the container 2 to the opposite end of the inner core 10. As can be noted in FIGS. 3a, 3b and 4, the thickness of the membrane is variable along its axial length and in the region of the outlet end of the inner core has an axially extending continuous uninterrupted annular band considerably thicker than the remainder of the flexible membrane 13, that is, the band is not separated in the axial direction by axially extending cuts.

At its end adjacent the opening from the container, the flexible membrane 13 has an outwardly extending flange bearing against a flange on the inner core is located at the opening from the container.

Figure 3A:
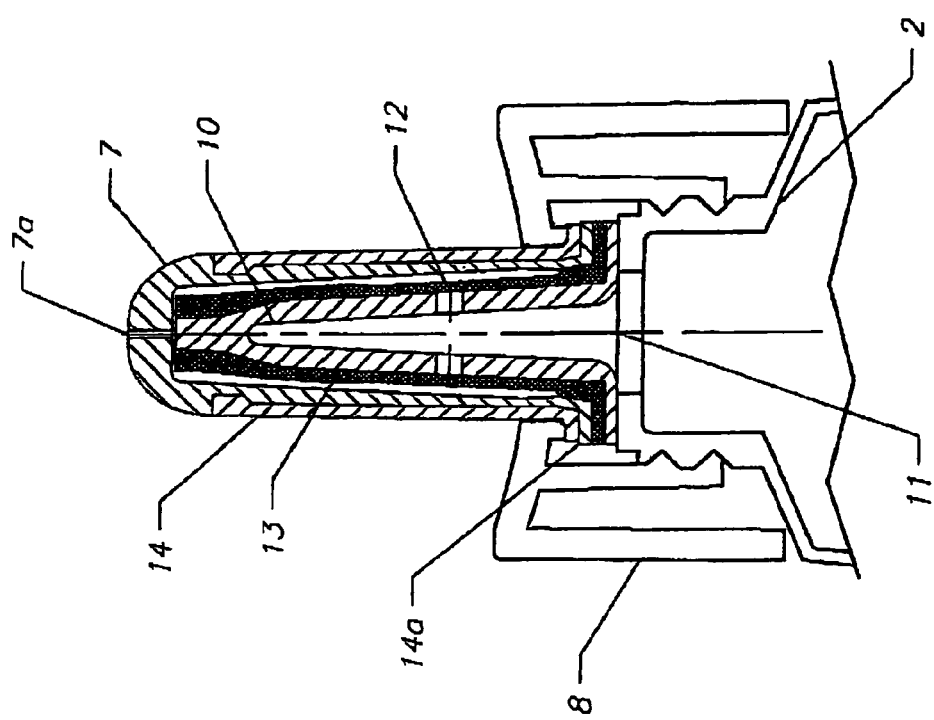
FIG. 3a is an enlarged axially extending partial view of the one way valve assembly in the at rest position.
Figure 4:
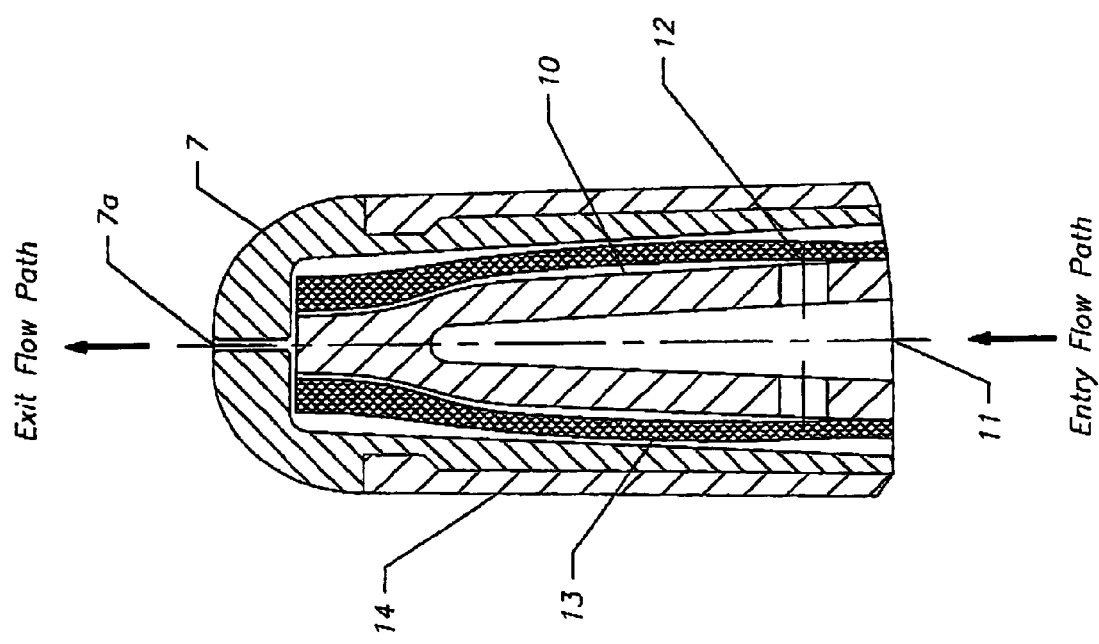
FIG. 4 is an enlarged partial axially extending view of the dispensing end of the one way valve assembly shown in FIG. 3b.

An axially extending valve cover 14 encircles the flexible membrane 13 and as shown in the rest position in FIG. 3a is spaced radially outwardly from the outer surface of the flexible membrane. The end of the valve cover 14 adjacent the container 2 has a radially outwardly extending flange 14a bearing against the flange at the end of the flexible membrane effecting the seal for the valve body at the opening from the container 2.

The valve cover 14 is formed of an inner layer of an elastomeric material extending axially from its flange 14a to and over the outlet end of the valve body 3. The elastomeric material forms a soft cover 7 over the outlet end of the increased thickness which is particularly advantageous when the valve assembly is used for dispensing an eye care solution. Such a soft cover 7 prevents any damage to the eye.

The soft cover 7 has an outlet orifice 7a for dispensing the flowable substance. The outlet orifice is closed in the rest position of the one way valve assembly, however, when the flowable substance is being dispensed and exits the outlet end of the flexible membrane, it flows radially inward to the outlet orifice which then opens allowing the substance to flow out of the valve assembly. When the flowable substance is dispensed and pressure on the source is withdrawn the outlet orifice 7a closes blocking any backflow into the valve assembly.

By selectively dimensioning the outlet orifice 7a a droplike amount of the flowable substance can be dispensed, for example if an eye care solution is being dispensed. If a greater amount of the flowable substance is to be dispensed the outlet orifice 7a can be formed for dispensing a larger quantity of the flowable substance. The outer orifice 7a can be formed to provide a spray or a stream of the flowable substance.

An over cap 15 is placed over the valve assembly when it is not in use protecting it from contact with ambient contaminants and for unintended dispensing.

When the flowable substance is to be dispensed, the over cap 15 is removed and pressure is applied to the actuator 2a of the container so that an amount of the flowable substance passes out of the container into the passageway 11 in the inner core 10. The substance flows through at least one port 12 and expands the flexible membrane 13 radially outwardly and flows toward the outlet end of the flexible membrane where it exits from the flexible membrane radially inwardly into the outlet orifice 7a in the cover and is dispensed.

By releasing the pressure on the actuator 2a of the container, the dispensing operation is terminated and the flexible membrane 13 returns inwardly into contact with the outer surface of the inner core 10. The inward movement of the flexible membrane start at its outlet end because of its increased thickness and affords gradual contact with the outer surface of the inner core returning any flowable substance through the ports back into the container whereby contaminants cannot enter the container.

Dispensing individual portions of the flowable substance can be continued until the container is almost completely emptied.

As mentioned, a variety of pharmaceuticals, cosmetics, food stuffs and other flowable materials can be dispensed where it is important to maintain them free of contaminants from the ambient atmosphere. The flowable characteristics of the material being dispensed determines the type and dimension of the valve body.

The material forming the outlet orifice 7a does not absorb the flowable substance, any substance entering the outlet orifice is ejected and does not return into the space between the inner core and the flexible membrane.

The invention claimed is:

1. A continuously sealing one way valve assembly and delivery system for dispensing a flowable substance, comprising:
    a source for storage of the flowable substance, the source having an opening;
    a valve assembly coupled to the opening of the source, said valve assembly including
        (i) an inner core having an inlet opening for receiving the flowable substance into a passageway and at least one port opening from the passageway,
        (ii) a hollow flexible membrane having a first end and a second end, the first end being thicker than the second end, wherein the hollow flexible membrane is fitted over an outer surface of the inner core and when the flowable substance is placed under pressure the flowable substance exits through the at least one port opening and expands said membrane outwardly from said outer surface of said inner core such that the flowable substance exits from the first end of the hollow flexible membrane;
    a cover enclosing the flexible membrane and having an outlet orifice for dispensing the flowable substance from the valve assembly when pressure is applied to the flowable substance and
    wherein when the pressure on the flowable substance is released, the first end of the hollow flexible membrane moves back into tightly fitting contact with the outer surface of the inner core before the second end of the hollow flexible membrane moves back into tightly fitting contact with the outer surface of said inner core.

2. The continuously sealing one way valve assembly and delivery system of claim 1, wherein the hollow flexible membrane has an axially extending uninterrupted continuous band at the first end of the hollow flexible membrane adjacent the outlet orifice in the cover and completely encircling the core.

3. The continuously sealing one way valve assembly and delivery system of claim 1, wherein said membrane has a radially outwardly extending flange at the second end thereof adjacent to the passageway of the inner core, and the cover also has a radially outwardly extending flange pressing the flange on the membrane into fluid tight contact with a radially outwardly extending flange at the passageway opening into the inner core.

4. The continuously sealing one way valve assembly and delivery system of claim 3, wherein a collar and connector member on the source secure the valve assembly to the source.

5. The continuously sealing one way valve assembly and delivery system of claim 4 wherein the connector member is a threaded screw which mates to the collar.

6. The continuously sealing one way valve assembly and delivery system of in claim 5 wherein the collar and connector member on the source effect a positive lock preventing opening of the source.

7. The continuously sealing one way valve assembly and delivery system of claim 1, wherein the outlet orifice in the cover is arranged so that it can dispense a selected quantity of the flowable substance.

8. The continuously sealing one way valve assembly and delivery system of claim 1, wherein the outlet orifice in the cover is formed of a soft material.

9. The continuously sealing one way valve assembly and delivery system of claim 1, wherein the outlet orifice in the cover is formed of a flexible material.

10. The continuously sealing one way valve assembly and delivery system of claim 1, wherein the cover is formed of an inner axially extending flexible member laterally enclosed by an axially extending rigid plastic shell.

11. The continuously sealing one way valve assembly and delivery system of claim 1, wherein an overcap is arranged to fit over and form a seal with said valve assembly sufficient to prevent external contamination from coming in contact with the valve assembly during storage.

12. The continuously sealing one way valve assembly and delivery system of claim 1, wherein at least two ports extend from the passageway through the inner core and to the inner surface of the flexible membrane.

13. The continuously sealing one way valve assembly and delivery system of claim 1, wherein the source comprises a collapsible reservoir reducible in volume in proportion as the flowable substance is dispensed from of the collapsible reservoir.

14. The continuously sealing one way valve assembly and delivery system of claim 13, wherein said collapsible reservoir is one of a bellows, a tube and an internal bag.

15. The continuously sealing one way valve assembly and delivery system of claim 1, wherein an axially extending housing laterally encloses the source.

16. The continuously sealing one way valve assembly and delivery system of claim 15, wherein the housing has a slot extending in the axial direction for applying dispensing pressure to an actuator of the collapsible reservoir.

17. The continuously sealing one way valve assembly and delivery system of claim 1, wherein the cover has a closed outlet orifice which opens for dispensing the flowable substance from the cover when dispensing pressure is applied to the source.

18. The continuously sealing one way valve assembly and delivery system, of claim 17, wherein the outlet orifice in the cover is impervious to the flowable substance and does not retain the flowable substance inwardly of the outlet orifice.

19. A one-way valve assembly and delivery system of claim 1, wherein the source is filled with a preservative free product.

20. A one-way valve assembly and delivery system of claim 19 wherein said preservative-free product is selected from one of pharmaceutical products, food stuffs, cosmetic products, and liquid vitamins.

* * * * *